INVENTOR.
LAWRENCE W. CUNNINGHAM
By White & Haefliger
ATTORNEYS.

United States Patent Office 3,549,420
Patented Dec. 22, 1970

3,549,420
METHOD FOR CLEANING PROCESS EQUIPMENT
Lawrence W. Cunningham, Westminster, Calif., assignor to Purex Corporation, Lakewood, Calif., a corporation of California
Filed Nov. 9, 1967, Ser. No. 681,719
Int. Cl. B08b 9/08, 3/08, 3/10
U.S. Cl. 134—22
17 Claims

ABSTRACT OF THE DISCLOSURE

A method for cleaning or processing or refining columns of the multiple plate, e.g., bubble cap tray, type commonly used in oil and gas refining and usually equipped with normally closed manways at different elevations.

The process employs passage of cleansing fluids both upwardly and downwardly through the column in a selected step sequence, the process being particularly distinguished from conventional practices by the employment of up flow through the plates or trays, in conjunction with which provision is made for foaming a cleaning liquid to entrain materials to be removed from the column, as well as to sequentially discharge the foam from the column through opened manways. The system provides for air injection into the column as well as steam heating of cleaning liquids and solutions as best suit the requirements of particular column conditions.

BACKGROUND, FEATURES AND OBJECTS OF THE INVENTION

Industry employs columnar equipment for various processes requiring intimacy of contact between liquids and gases or vapors. Among the most generally employed types are so-called bubble tray columns in which liquid cascades down over and through the column trays in intimate gas or vapor contact effected by bubble caps about riser necks on the trays. Commonly such columns are built to considerable height as required for necessary numbers of trays, and provision is made for access to the trays by manways in the side of the columns.

In the course of operation the columns usually become fouled with various kinds of accumulations depending upon the materials being processed. Such accumulations may be inorganic, as in the nature of dirt, scale and precipitates, and/or organic such as tars, polymers and other cumulative residues.

Heretofore such columns taken offstream have been cleaned to various degrees manually by workmen having access to the trays through the manways, and also by cascading cleaning solutions, solvents and the like downwardly through the columns. Manual cleaning is time-consuming and expensive particularly in column down time. Cascade cleaning tends to be incomplete because the cleaning liquid takes the same paths down through the trays as the processing liquid phase and tends to leave insolubles on the trays.

The present invention is predicated upon a different concept of employing up-flow of cleaning liquids in a manner tending to dislodge fouling materials from down flow dictated locations and to entrain dislodged particles to be carried upwardly and out of the column. This up-flow technique is used in conjunction with one or more cascading treatments, the particular relations and sequences being variable depending upon conditions and fouling compositions in the column.

Particularly contemplated is the employment of an up-flow cleaning stage in which a cleaning liquid is extensively agitated and/or foamed as by employing a foaming agent and air or gas injection into the base of the column. The combined effects of agitation and foaming are to create an effective entrainment medium for suspension and removal of the particles from the column.

A further important development in conjunction with up-flow cleaning is the avoidance of having to carry the entrainment throughout the full length of a column, particularly one of considerable height. The invention provides for progressive segmental height cleaning by the procedure of removing the manway covers, initially discharging the cleaning up-flow out through a lower manway, then closing the latter and discharging the flow through a next upper manway, and so on through the remaining manway-equipped extent of the columns to its top vapor outlet.

Various adjunctive provisions are made, e.g., for steam heating of cleansing liquids, preparation and pumping of predetermined solutions and solvents, and air or gas injection into the column as required.

All the aforementioned features of the invention will be more fully understood from the following detailed description of illustrative procedures in reference to the accompanying drawing.

DESCRIPTION OF THE PREFERRED EMBODIMENTS

Figure 1:
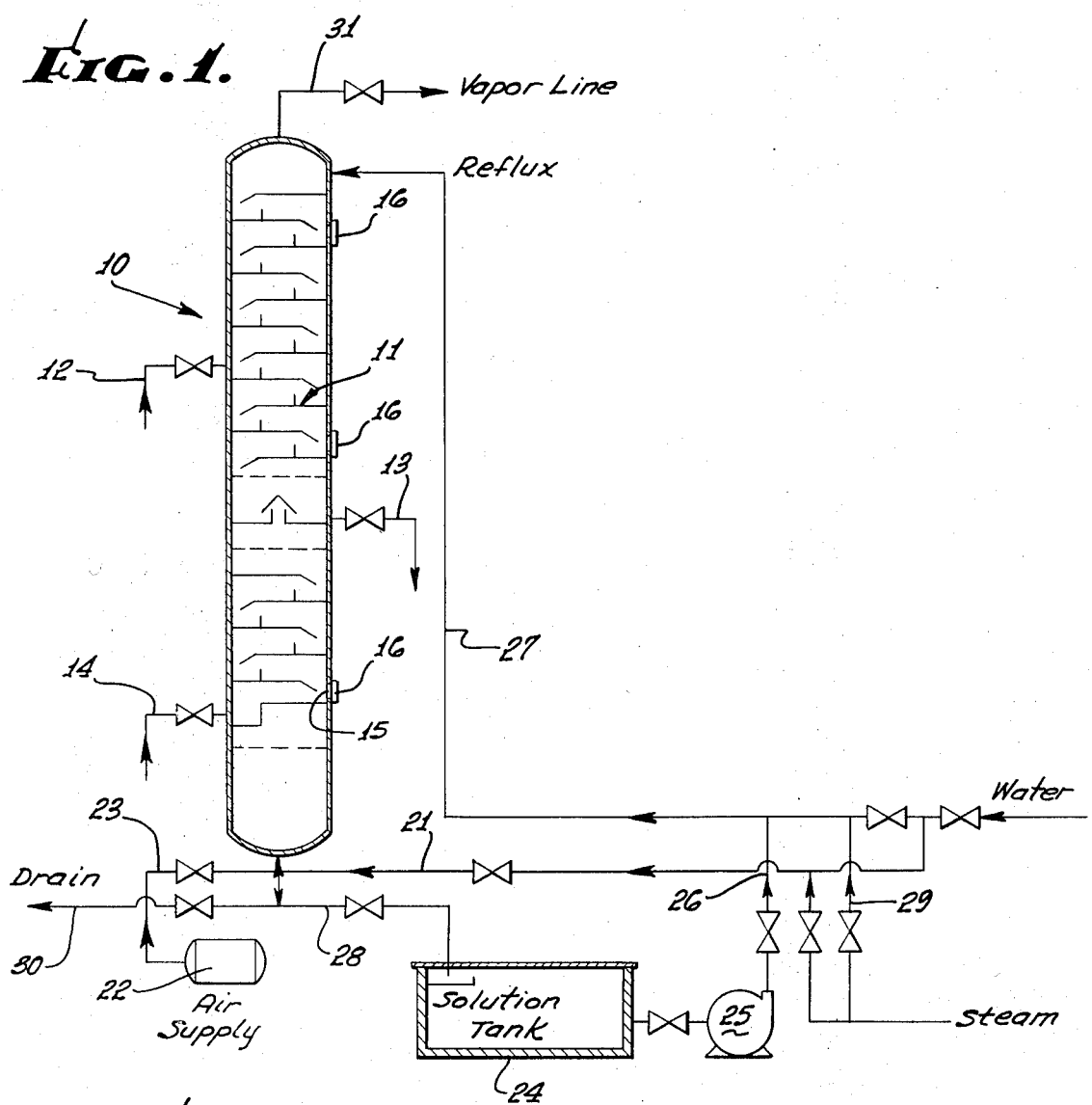
FIG. 1 is a diagrammatic showing of a conventional refinery column and associated piping and equipment for cleaning purposes.

In reference first to FIG. 1, the showing of column 10 is intended to typify the various known multiple plate or tray columns employed for such purposes as fractionating, distilling, stripping and like operations, productive after extended use of inorganic and/or organic residues or deposits within the column shell and on the trays. In FIG. 1 the multiple plate or tray sequence is diagrammatically indicated at 11, as are conventional feed, intermediate drawoff and bottom inlet lines 12, 13 and 14. Such columns also usually have manways 15 closed by removable covers 16 at vertical intervals which may be many in the case of tall columns containing, e.g., 50–100 trays.

Figure 2:
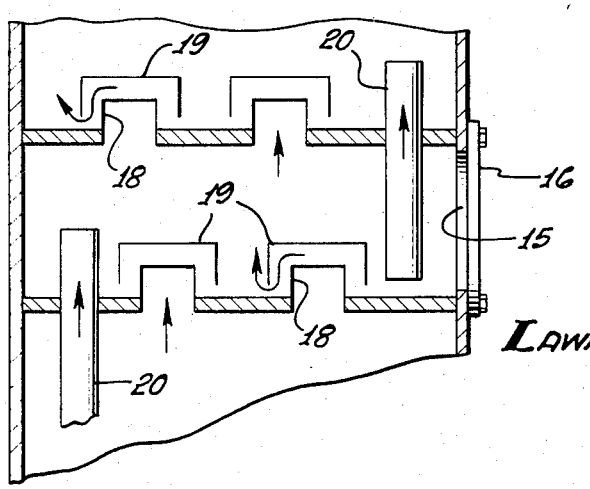
FIG. 2 diagrammatically illustrates one of known forms of bubble tray columns.

FIG. 2 illustrates the essentials of one form of bubble tray having the usual vapor risers or necks 18, overlying bubble caps 19 and overflow or down pipes 20.

As previously indicated, the invention is particularly distinguished from past cleaning methods by up-flow of of selected cleaning liquids through the trays and out through manway openings. The total operation may employ additionally any of various combinations of cascading or down flow stages as well as different flushing or cleaning liquid compositions, all as required to meet conditions in any given instance. Illustratively, I may employ a sequence of steps and cleaning media described in the following.

Step 1

The manway covers 16 are removed and the bottom section of the column is filled with water from line 21 to the level of the lowermost manway opening 15. Compressed air from source 22 is discharged through line 23 into the base of the column to upwardly surge the water and cause it to entrain loose fouling particles. The water will be repeatedly pulsed or surged by air introduction until the outflow through the manway opening is substantially free from such particles.

As will be understood in reference to FIG. 2, the up flow and surges occur in the direction of the arrows through tubes or equivalent passages 20, and also through the vapor necks 18 into and out of the bubble caps 19, thus creating a fouling displacement flow the reverse of operational cascading flow conditions under which the fouling accumulated.

After first stage cleaning and flow through the lower manway, the latter is closed by its cover, the same procedure is repeated to flush the extent of the column above and to the next open manway, and sequentially thereafter until the entire column has been reverse flushed and all manway covers have been replaced.

Step 2

A cleaning solution next is taken from tank 24 by pump 25 and discharged through line 26 and the normal reflux line 27 for cascading flow through the column. When the solution has returned through line 28 to the tank in sufficient quantity to maintain a desired circulating rate or volume, stream is introduced from line 29 to heat the solution to desired temperature. Circulation of the heated solution thereafter is continued at proper concentration and temperature for a period of time, e.g., from about 4 hours to 24 hours, sufficient to enable effective action of the solution on fouling accumulations in the column. Then the solution may be drained from the column into the solution tank 24 or otherwise disposed of through line 30. The column vapor line 31 is left open during this cleaning stage.

Solution compositions may be selected and predetermined in accordance with the expectable nature of the fouling accumulations resulting from particular column functions. In general such accumulations may be inorganic or organic and may include scale, corrosion, sulfur or sulfur compounds, and dirt residues from the column feed. Most effective compositions may depend on the material of construction of the equipment which is to be cleaned, the chemical composition of the inorganic components of the deposits, the nature and amount of organic occlusion in the deposit which is to be removed, and on the plant facility with respect to what it can dispose of from the standpoint of water pollution or volume of waste water, or on the degree of cleaning required. For example, if the plant is shut down for welding repairs which necessitates the cleaning to remove potentially inflammable or explosive organic matter evolved under the heat of the welding torch the complete removal of sulfides and oxides may not be necessary and acid treatment and neutralization is unnecessary. The following recommendations were drafted with such contingencies in mind.

EXAMPLE I

For the removal of deposits containing substantial amounts of organic matter, e.g., oil, grease, and carbon, I may use a mixture of NaOH (20–80%), $Na_2SiO_3$ or $Na_3PO_4$ (5–20%), $Na_4P_2O_7$ (5–15%), sodium rosinate (1–5%), nonionic surfactant, e.g., isooctyl phenyl poly ethoxy ethanol (0–2%), anionic surfactant, e.g., sodium tridecylbenzene sulfonate (0–3%) at a concentration effective to provide a solution alkalinity titratable to the phenolphthalein indicator end point (P) of 4–8% expressed as percent $Na_2O$. A preferred specific example of this composition is NaOH 76%, $Na_3PO_4$ 19%, sodium rosinate 2.5%, nonionic surfactant 0.5%, and anionic surfactant 2%, employed in the range of 8–16 ounces per gallon and at a temperature of 180–210° F. Where the organic matter includes considerable asphalt, residual fouling and low end gums, it is advantageous to fortify this solution with 2–10% of an emulsifiable solvent additive composed of aromatic petroleum distillate, having a flash point of 150° F. or higher (15–95%) with or without ortho-dichlorobenzene (0–70%), and sulfonated alkylate type emulsifiers (5–15%). A preferred specific example of this additive contains aromatic distillate 22.5%, ortho-dichlorobenzene 67% and sulfonated alkylate 10.5%. When the solvent additive is employed, the operating solution temperature is restricted to 180° F. maximum. If the deposit contains substantial amounts of sulfides and oxides which must be raised to about 7–16% $Na_2O(P)$ alkalinity range and chelating ingredients are added, e.g., aldonates (sodium gluconate, glucoheptonate, or saccharate), polyaminopolycarboxylates (e.g., EDTA), and polyalkanolpolyamides (e.g., N,N',N'',N'''-tetrakis(2-hydroxypropyl)ethylenediamine). Such chelating alkaline compositions are the subject of U.S. Pats. 2,843,509, 2,992,946, 2,992,995, 2,992,997, 3,095,380, issued to Arden et al., and 3,080,262 issued to Newman.

EXAMPLE II

For the removal of inorganic deposits containing little or no organic matter from equipment constructed of low carbon steel and in the absence of other ferrous or non-ferrous alloys, inhibited 2 M HCl may be used at ambient to 140° F. maximum. Ammonium bifluoride, in the amount of 1–2% may be added to the HCl solution to permit attack on silica components of the deposits, while non-ionic surfactants (0.01–1.0%) may be added to emulsify entrained oil. For systems constructed of mixed metals, i.e., ferrous alloys, stainless steels, and copper alloys the preferred solution for the removal of oxides in the presence of some oil is $H_3PO_4$ (1.7–2.4 M) containing effective amounts of nonionic and cationic surfactants, antifoams and corrosion inhibitors. The operating temperature range is ambient to 180° F. maximum. Where the fouling is heavier and contains oil, carbon, grease, or light tower ends, a mixed acid solution is preferred, e.g., $H_3PO_4$ (0.06 M) plus $H_2SO_4$ (0.08 M) containing about 1% of emulsifiers and about 3.2% of aromatic petroleum solvent at an operating temperature range of ambient to 180° F.

Step 3

Heavy flow of rinse water is introduced to the top of the column through the reflux line 27 and cascaded through the column to drain line 30 for a period sufficient to rinse out the cleaning solution. If hot rinse water is desired, steam is introduced from line 29 and the column may be circulated as by flow through tank 24 from which the solution has been removed. If surging in the column is desired air may be introduced to its base. When the rinse water is sufficiently clean the rinsing operation is discontinued and the column is drained.

Step 4

If an acidic solution is used in Step 2, the column is flushed with a suitable neutralizer solution prepared in tank 24, and preferably containing a foaming agent that may be added from time to time. This neutralizer solution is circulated, with or without steam heating, through the reflux line, column and tank until a pH check shows a level of alkalinity suitable for foam creation with injected air. All lines to the bottom of the column are then closed to hold the neutralizer solution in the column.

NEUTRALIZER

The neutralizer may be any alkali, but the preferred alkalies are $Na_3PO_4$ and $Na_2B_4O_7$ (Borax), which tend to leave the neutralized ferrous surfaces with a protective coating, and mixtures of these with $Na_2CO_3$, $Na_4P_2O_7$ and surfactants. A preferred composition is: $Na_3PO_4$ 89%, $Na_4P_2O_7$ 10%, anionic sulfonate 1%. This neutralizer is added to the recirculating rinse water in an amount which is effective to raise the pH above 7. The amount will vary depending on the analysis of the water used, and upon amount of acid retained in the equipment to be neutralized.

Step 5

All manway covers 16 are removed and water is introduced to the base of the column together with periodic air blasts to generate an active surging foam (foaming agent may be added to the water as required) up to the level of the lowermost open manway. Thus agitated and surged the foam has high capacity for entrainment of fouling particles which are carried in the effluent through the manway. After foaming of the effluent is observed, air injection is discontinued and the water up flow is continued with maximum turbulence until the effluent is virtually clean. After closure of the lowest manway, the operation is repeated into the successive manway-defined sections of the column above.

When all manways have been closed the column is drained and then if desired the covers may be removed for inspection.

For increasing the foaming power of recirculating water or of the alkaline or acid solutions of the above examples, nonionic or anionic surfactants may be added at concentrations of 0.001–1.0% depending on the foam height which is desired.

Foaming agents generally are amphipathic long chain molecules having a hydrophilic head and a hydrophobic (hence a lipophilic) tail. When such molecules are dissolved in water, the heads are accepted by the water and the tails are rejected, with the result that the surface layer of the solution literally bristles in molecular dimensions like velvent with a nap of the tightly packed, oriented tails of these surfactant molecules.

One result of such solution surface orientation of the molecules is that the tails seek a hydrophobic phase into which they can submerge themselves. Air is one such hydrophobic phase. Hence surfactants having foaming properties, oil emulsifying power, and insoluble dirt dispersing power, but the properties vary from species to species of surfactant and also with the conditions of use. The foaming agents useful for the practice of this invention are those which are compatible with the solvents of the foregoing examples and neutralizer solutions. The nonionic surfactants have universal chemical compatibility in these solutions, but they have a serious disadvantage of "inverse solubility" by which is meant that they precipitate out of the solution on heating past their "cloud point," and redissolve again on cooling past the cloud point. These nonionics have for their hydrophobic portion a long chain ($C_{8-10}$) alkanol or mercaptan, a ($C_{8-12}$) alkyl phenol, or a poly(propylene oxide) moiety and for their hydrophilic portion a poly(ethylene oxide) moiety. Long chain ($C_{8-18}$) fatty acid esters of poly(ethylene oxide) comprise another type of nonionic which is useful under mild chemical conditions which do not split the ester linkage by hydrolysis or saponification. The poly(ethylene oxide) moiety contains $n$ average moles of ethylene oxide, wherein $n=1-50$. A preferred species is isooctyl phenyl poly-(ethoxy) ethanol wherein $n=9-10$ and which has a cloud point of 150° F. The cloud point rises with increasing $n$, until for $n>20$ the cloud point $>212°$ F.

The anionic types are those which are compatible with acids and to some extent also with polyvalent cations. For these the hydrophobe is one or more selected from the group consisting of long chain ($C_{8-20}$) alkyl-sulfate or -sulfonate, a ($C_{6-18}$) alkyl-benzene-sulfonate, and a ($C_{3-9}$) di-alkylnaphthalene-sulfonate. A preferred species, is sodium tridecylbenzene sulfonate.

It will be understood with respect to useable cleaning solutions, foaming agents, inhibitors and the like that these may be selected from various known and available industrial products obtainable to particular use specifications. The present invention is more directly concerned with flow directions, physical liquid states, and operative sequences in columns being cleaned, whatever may be the particular solutions employed.

I claim:
1. The method of cleaning a vertical shell column containing a plurality of liquid passing plates therein, that includes flowing a cleansing liquid upwardly through a succession of the plates and out of the column through a manway passage in the side thereof.

2. The method of claim 1 in which column fouling materials are entrained in the liquid leaving the column and flowing of the liquid is continued until the entrained materials reach such low concentration as to indicate substantially complete removal from the column of fouling materials entrainable in the liquid.

3. The method of claim 1, in which said liquid is essentially water.

4. The method of claim 1, in which said liquid is heated by steam injected into the liquid.

5. The method of claim 1, in which an agitating gas in introduced to the liquid in a manner to pulsingly surge the liquid upwardly through the column.

6. The method of claim 1 in which said plates have bubble capped vapor necks and liquid overflow down passages, and including also pumping said liquid upwardly through the bubble caps and said down passages.

7. The method of claim 6 in which the liquid flows from the column at an intermediate plate location through a manway passage in the side of the column.

8. The method of claim 1 in which the liquid is at least partially in the form of foam acting to entrain fouling materials in the column.

9. The method of claim 8 in which the liquid is foamed by the introduction of air thereto.

10. The method of claim 1 in which the column shell has a plurality of vertically-spaced, normally closed manway passages in a sidewall thereof and in which the cleansing liquid flows out of a lower opened passage followed by closure of the last mentioned passage and flow of the liquid through an upper opened passage.

11. The method of claim 10 in which the upwardly flowing liquid is foamed to assist entrainment of materials to be removed from the column.

12. The method of claim 11 in which the liquid contains a foaming agent and air is injected periodically into the liquid within the base of the column to pulsingly surge the liquid upwardly through the column.

13. The method of cleaning a vertical shell column containing a plurality of liquid passing plates therein and having a plurality of normally closed vertically-spaced manway openings in a sidewall thereof, said method comprising the steps of:
(a) flowing a flushing liquid upwardly within and out of the column said liquid leaving the column through a manway opening therein,
(b) closing said manway opening and thereafter flowing a chemical cleaning solution downwardly through the column, and
(c) flowing a foamed liquid upwardly within and out of the column.

14. The method of claim 13, in which step (b) is followed in advance of step (c) by flowing a rinsing liquid downwardly through the column.

15. The method of claim 14 in which after flow of the rinsing liquid and in advance of step (c) a neutralizing solution is passed down through the column.

16. The method of claim 13 in which step (c) is conducted by flowing the foamed liquid through an opened lower manway passage followed by closing the passage and then flowing the foamed liquid through an opened upper manway passage.

17. The method of claim 16 in which the liquid is foamed by air introduced to the base of the column.

References Cited

UNITED STATES PATENTS

| | | | |
|---|---|---|---|
| 2,662,041 | 12/1953 | Dougherty et al. | 134—22X |
| 2,662,042 | 12/1953 | Dougherty et al. | 134—22 |
| 2,681,657 | 6/1954 | Griffith | 134—22UX |
| 3,037,887 | 6/1962 | Brenner et al. | 134—22 |
| 3,350,223 | 10/1967 | Monteath | 134—22 |

MORRIS O. WOLK, Primary Examiner

B. S. RICHMAN, Assistant Examiner

U.S. Cl. X.R.

134—26, 34